United States Patent [19]

Newman et al.

[11] Patent Number: 5,114,630

[45] Date of Patent: May 19, 1992

[54] CONTINUOUS MANUFACTURE AND CASTING

[75] Inventors: Kirk E. Newman, Newport News; James A. Gusack, Williamsburg; John A. Zehmer, III, Newport News, all of Va.

[73] Assignee: The United of America as represented by the Secretary of the Navy, Washington, D.C.

[21] Appl. No.: 586,182

[22] Filed: Sep. 21, 1990

[51] Int. Cl.$^5$ ............................................. C06B 21/00
[52] U.S. Cl. ........................ 264/3.1; 264/3.3; 264/3.4; 86/20.12; 102/292
[58] Field of Search ............. 86/20, 12; 102/292; 264/3.1, 3.3, 3.4

[56] References Cited

U.S. PATENT DOCUMENTS

| | | | |
|---|---|---|---|
| H705 | 11/1989 | Selzer et al. | 149/109.6 |
| 3,296,093 | 1/1967 | Fluke et al. | 149/19 |
| 3,618,902 | 11/1971 | Brennan, Jr. | 259/6 |
| 3,766,820 | 10/1973 | Forsten et al. | 149/105 X |
| 4,014,655 | 3/1977 | Brunnberg | 149/102 X |
| 4,314,963 | 2/1982 | Boden et al. | 264/53 X |
| 4,730,534 | 3/1988 | Dupont | 86/20.12 |

OTHER PUBLICATIONS

Husband, *Cont. Processing of Composite Solid Propellants*, Chem. Eng'g. Progress, May, 1989, pp. 55-61.
Levenspiel, *Chemical Reaction Eng'g*, Wiley, 2nd Ed., 1972, pp. 97, 100, 101, and 107-111.
Froment et al., *Chemical Reactor Analysis and Design*, Wiley, 1979, pp. 392-394.
Jakopin, *Compounding of Fillers*, Advances In Chemistry Series, No. 134, 1974.
*Continuous Flow Processor*, Teledyne Readco, York, PA, Mixing-A fine Blend of Art & Science, Teledyne, Inc. 2nd Qtr. 1982.
Teledyne Readco Processing and Mixing Equipment, Teledyne Readco, York, Pa.
K-Tron Ad., Chem. Equipment, Aug. 1989, p. 23.
Fitzgerald et al., *Oscillation Viscometer*, Measurement and Control, Jun. 1986, *Proc. of Cont. Mixer and Extruder User's Group Meeting*, Nov. 30-Dec. 2, 1987.
*PBX Mixing and Casting Review*, Hartman et al., Hercules, Inc., Nov. 6-7, 1980.

Primary Examiner—Peter A. Nelson
Attorney, Agent, or Firm—W. C. Townsend

[57] ABSTRACT

Fluid products, particularly highly filled materials, are manufactured and cast in a continuous system utilizing feedforward composition quality control and plug flow. Liquid and solid raw are supplied to, and combined in, a continuous fluid flow system in which plug flow is established. Quantities of materials supplied are measured and averaged over time to determine composition proportions, which are compared to specification. Running averages are maintained for successive serial portions of the continuous plug flow stream. In-specification product is diverted to casting and off-specification to waste, after a time delay so that appropriate diversion is accomplished for each particular, composition-determined serial portion of the product flowstream.

15 Claims, 4 Drawing Sheets

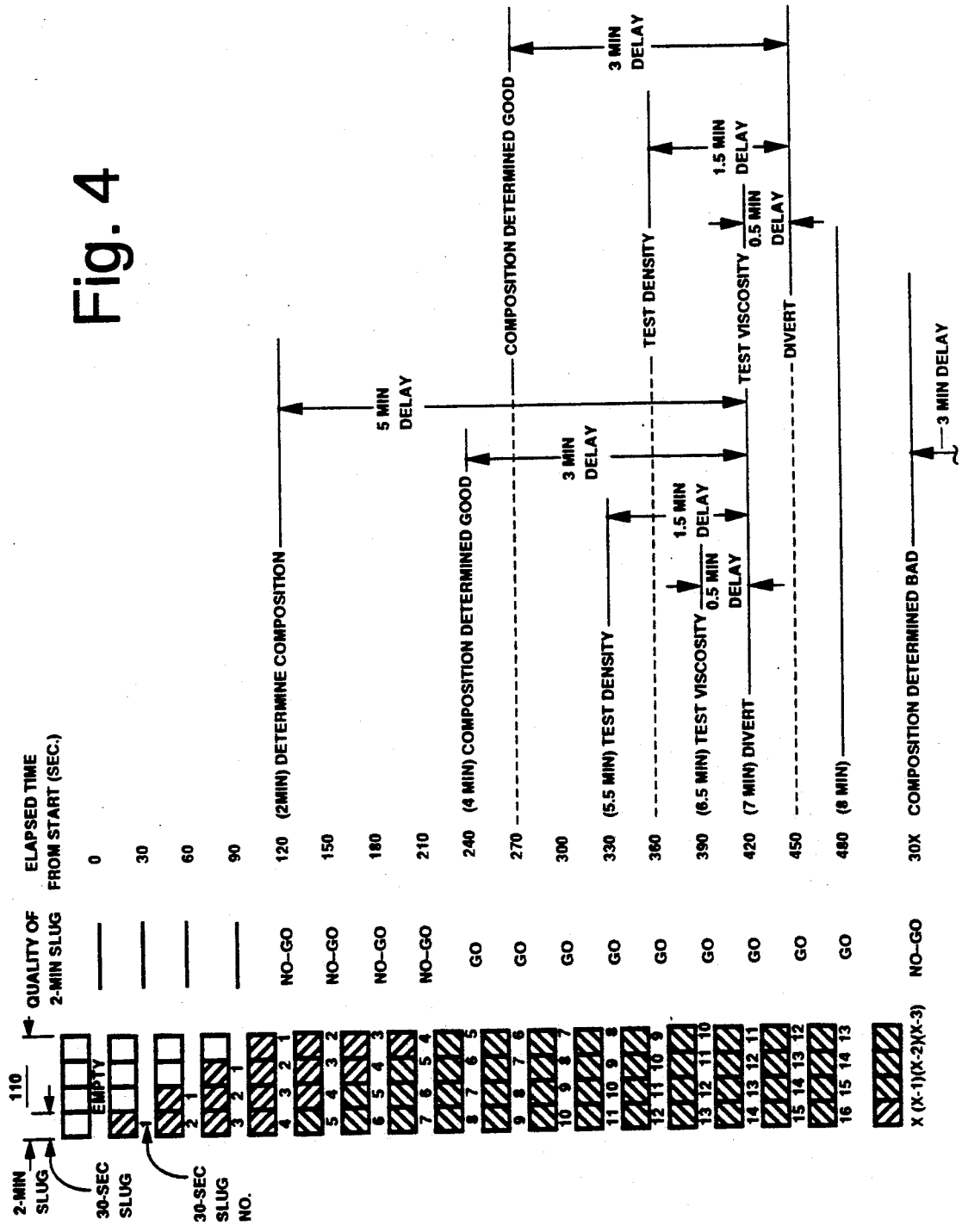

CONTINUOUS MANUFACTURE AND CASTING

BACKGROUND OF THE INVENTION

Highly filled, energetic materials are normally produced by batch processes. Raw materials, liquid and solid, are added to a mixing vessel at appropriate points in the processing procedure, and the resulting batch of fluid product is cast from the vessel into a plurality of molds to solidify.

The disadvantages of batch production have long been recognized, and include high costs in capital investment and labor intensity, low production rates, long processing times, spillage, and safety concerns. Various continuous schemes have been proposed heretofore, but have had some disadvantage or deficiency which prevented their being completely satisfactory. For example, Fluke et al, in U.S. Pat. No. 3,296,043, proposed a continuous system, but in practice process control was a problem and the products failed to consistently meet chemical composition specification. Brunnberg, in U.S. Pat. No. 4,014,655, proposed another continuous operation, but this system also suffered from composition quality control problems in practice. Other proposed systems were found to be susceptible to hazardous incidents such as fire and/or accidental detonation. A summary of the state of the art is in "Chemical Engineering Progress", May, 1989, at pp. 55-61. All previously known continuous systems relied, in the end, on after-the-fact, wet chemical laboratory analysis of the product to determine whether it met composition specification, and the length of time required to perform such analyses produced results that were far too late to save substantial quantities of any cast product that wa determined by the analysis to be out of specification.

Accordingly, a main object of the invention is the provision of an improved method and apparatus for continuously producing fluid products, particularly highly filled, energetic materials.

Another object of the invention is to provide a continuous manufacturing and casting system which overcomes the difficulties associated with the prior art, and reliably results in products which meet composition specification.

Still another object of the invention is the provision of an improved, continuous system which accurately produces product to a composition specification without reliance on unacceptably slow wet chemical analysis, and with a minimum of waste.

Yet a further object of the invention is to provide a continuous system which is safe in operation.

Other objects and advantages of the invention will appear from the following detailed description which, together with the accompanying drawings, discloses a preferred embodiment of the invention for purposes of illustration only. For definition of the invention, reference will be made to the appended claims.

BRIEF DESCRIPTION OF THE DRAWINGS

FIG. 4 graphically depicts the operation of the control arrangement of FIG. 3.

DETAILED DESCRIPTION OF THE PREFERRED EMBODIMENT

Figure 1:
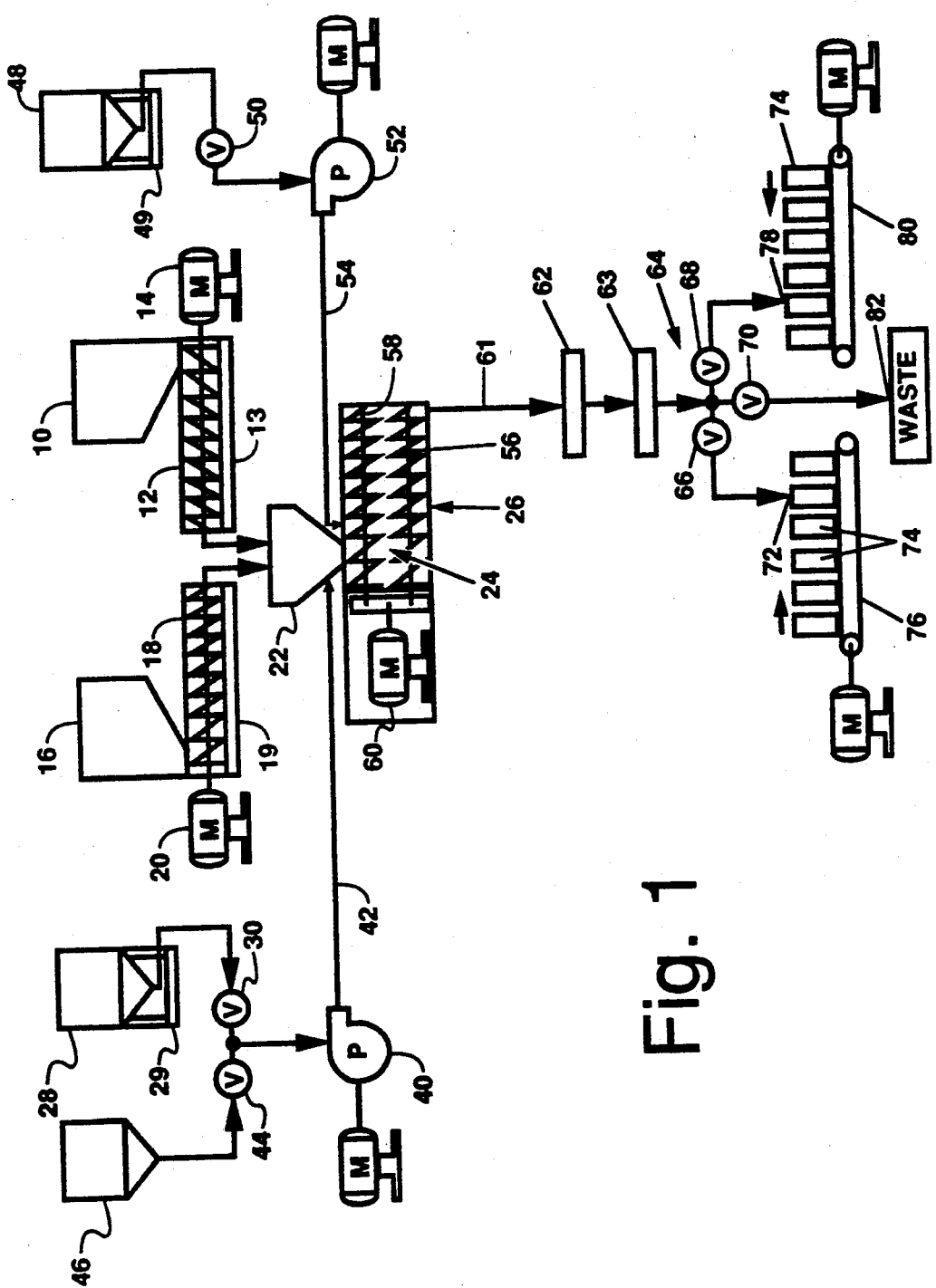
FIG. 1 diagrammatically illustrates a continuous manufacturing and casting system embodying principles of the invention.

Solid, particulate material which will constitute one solid filler dispersed in the fluid product to be produced is contained in the hopper of conventional loss-in weight (LIW) feeder 10, and continuously fed to screw conveyor 12 carried by weigh bridge 13 and driven by motor 14. A second solid, particulate material which will also constitute a dispersed filler is continuously fed from the hopper of second LIW feeder 16 to another screw conveyor 18 carried by weigh bridge 19 and driven by motor 20. Both screw conveyors effect a metered discharge into hopper 22 which continuously feeds its contents into inlet region 24 of a combining zone in the form of a co-rotating, twin-screw compounder 26.

A binder premix slurry is contained in liquid LIW feeder 2 including a weigh bridge 29. The premix contains the first of two liquid constituents that will react with one another to form a binder for the product. The premix is continuously fed through valve 30 to motor-driven pump 40 which discharges through conduit 42 into hopper 22. Valve 44, which communicates with vessel 46 as will be described later, is closed at this time. The premix also contains a catalyst for the binder-forming reaction, and may also contain other additives for the product, as desired.

The second liquid binder constituent or reactant is contained in second liquid LIW feeder 48 that includes weigh bridge 49. Liquid from feeder 48 is continuously fed through valve 50 to motor-driven pump 52 which discharges the liquid through line 54 into inlet region 24 of hot water-jacketed compounder 26.

Compounder 26 has twin screws 56, 58 that are driven by motor 60 to rotate in the same direction within the confining interior peripheral walls of the combining zone. The action of the screws continuously mixes the supplied raw materials to form a fluid product of high viscosity, with the particulate solid filler materials being dispersed throughout the matrix formed by the reacting liquid binder materials. The compounder, in addition to combining the supplied materials, sets the product in motion from left to right as viewed in FIG. 1, in a continuously flowing stream through the compounder and the downstream piping. It is very important in accordance with the invention that plug flow be established in the combining zone as well as the downstream piping, and such flow is established by the co-rotating, twin-screw compounder, by controlling the amount of filler in the mix, and by controlling the amount of reaction catalyst in the mix. The compounder functions as a plug flow reactor, in which the product flows in accordance with the relationship $T = VE/Uo$, where T equals residence time in the combining zone, in the dividend V equals volume of the combining zone and E equals degree of fill of the combining zone, and the divisor Uo equals the volumetric feed rate of materials entering the combining zone. In plug flow, all fluid elements move with a uniform velocity along parallel streamlines (i.e., velocity and direction are essentially constant at all points across the cross-section of the flowstream), except for negligible boundary layer effects. It will be understood that the value T at which plug flow is achieved is a figure of merit that will vary with particular reactors. In the preferred embodiment, T is nominally two minutes and for practical purposes is about 2.0 minutes ±10%. Discussions of plug flow and plug flow reactors are in the texts "Chemical Reactor Analysis and Design", by Froment and Bischoff, published by Wiley, 1979, at pp. 392 et seq., and "Chemical Reaction Engineering", by Octave Levenspiel, Wiley, 1972, at pp. 97, 100-101, 107-111. The establishment of plug flow conditions in the continuous fluid flow system makes it possible to operate in accordance with the invention.

The fluid product is discharged from compounder 26 into conduit 61 and passes downstream, still in continuous plug flow, through densitometer 62 and viscometer 63 to a diverting zone which is generally indicated at 64 and includes valves 66, 68 and 70 respectively located in branch conduits communicating with line 61. The branch conduits are in parallel (as opposed to series) flow relationship with one another. Thus, opening valve 66 and closing valves 68 and 70 diverts the product flowstream to product outlet 72 from which it is cast into one of a series of molds as at 74 on motor-driven, stop-and-go conveyor 76. The conveyor transports empty molds from left to right as viewed in FIG. 1 to be stopped and filled under product outlet 7 and then moved to the far right end of the conveyor for removal while another empty mold is placed under outlet 72. If desired, the mold to be filled may be enclosed in a portable vacuum chamber (not shown) so that the product emerging from the product outlet is degassed as it is cast.

To prevent spillage from product outlet 72 onto conveyor 76 between molds as a filled mold is transported out from under outlet 72 and an empty mold placed, valve 66 is closed and valve 68 opened to divert the product stream to a second product outlet 78 which discharges into an empty mold on a second conveyor 80 that operates in the same manner as conveyor 76 except that conveyor 80 transports the molds from right to left as viewed in FIG. 1. When the mold on conveyor 80 is filled, valve 68 is closed and valve 66 reopened, to begin the filling cycle again on conveyor 74 while the filled mold is removed and an empty mold moved under outlet 78 in preparation for the next cycle on conveyor 80.

If, however, the serial portion of the product flowstream arriving at diverting zone 64 has been determined as hereinafter described to be out of specification, valves 66 and 68 are both closed and valve 70 is opened to divert the flowing product stream to waste outlet 82 from which it is collected until the arriving flowstream is again determined to be in specification and valve 70 is closed and either valve 66 or valve 68 is opened to again divert the product stream to casting.

Figure 2:
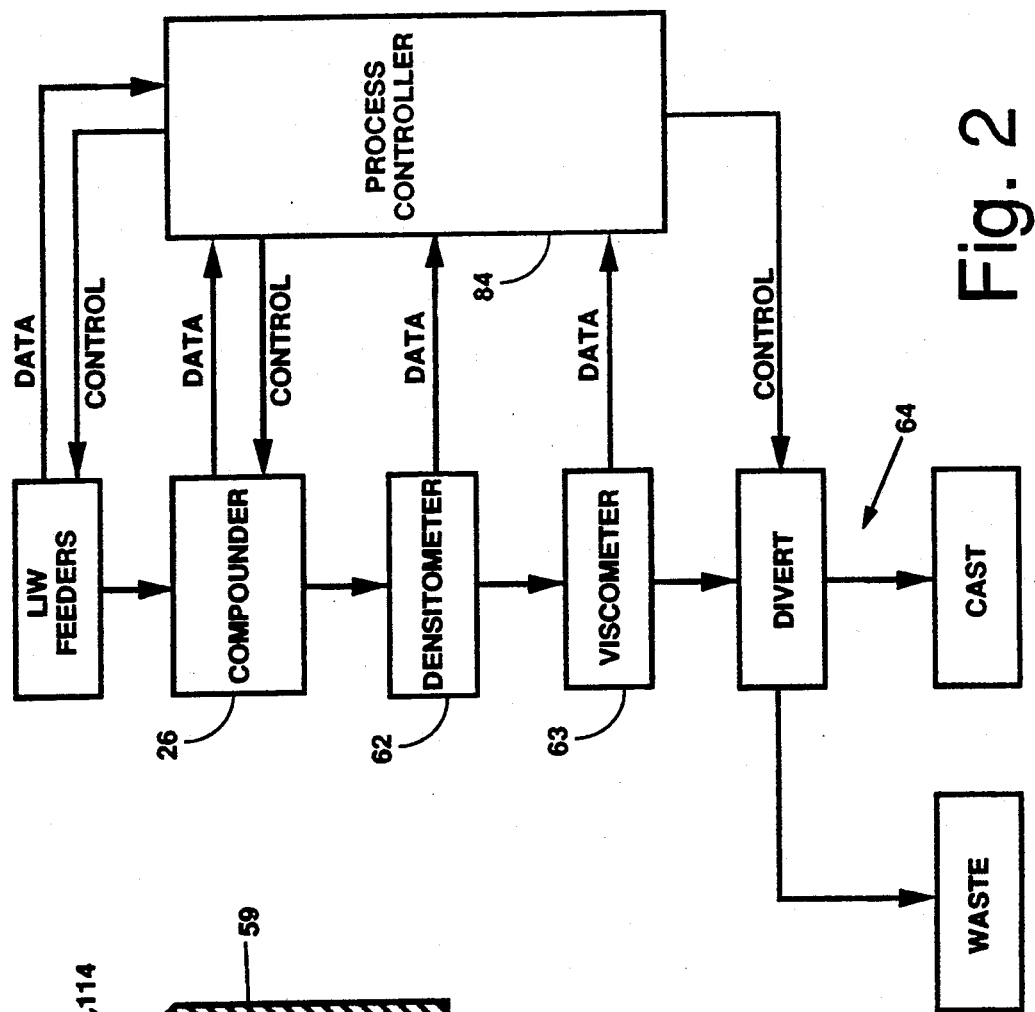
FIG. 2 is a block diagram schematically illustrating the control system of the arrangement of FIG. 1.

With reference to FIG. 2, which has been simplified for purposes of illustration, data in the form of gravimetric flow rates are provided from the LIW feeders (10, 16, 28, and 48 in FIG. 1) to automatic process controller 84, which in return provides control signals to the feeders to adjust flow rates as necessary. Data from compounder 26, such as motor revolutions per minute, motor power consumption, product temperature at the combining zone, and product pressure at the discharge of the combining zone, are also provided to controller 84, and the compounder responds to signals from the controller to adjust operating parameters as determined by the controller to be appropriate to maintain desired setpoint conditions. The foregoing data acquisition and control are accomplished in a conventional way and form no part of the invention. However, controller 84 also provides control signals to open and close valves 66, 68, and 70 (see also FIG. 1) to divert the product flowstream to casting or waste, depending upon its determination of the composition of the product arriving at diverting zone 64 from the input data from the LIW feeders, in a feed-forward manner that is according to the invention and will be described in detail below. Controller 84 also receives signals that are indicative of the density and viscosity of the product from densitometer 62 and viscometer 63, respectively.

Figure 3:
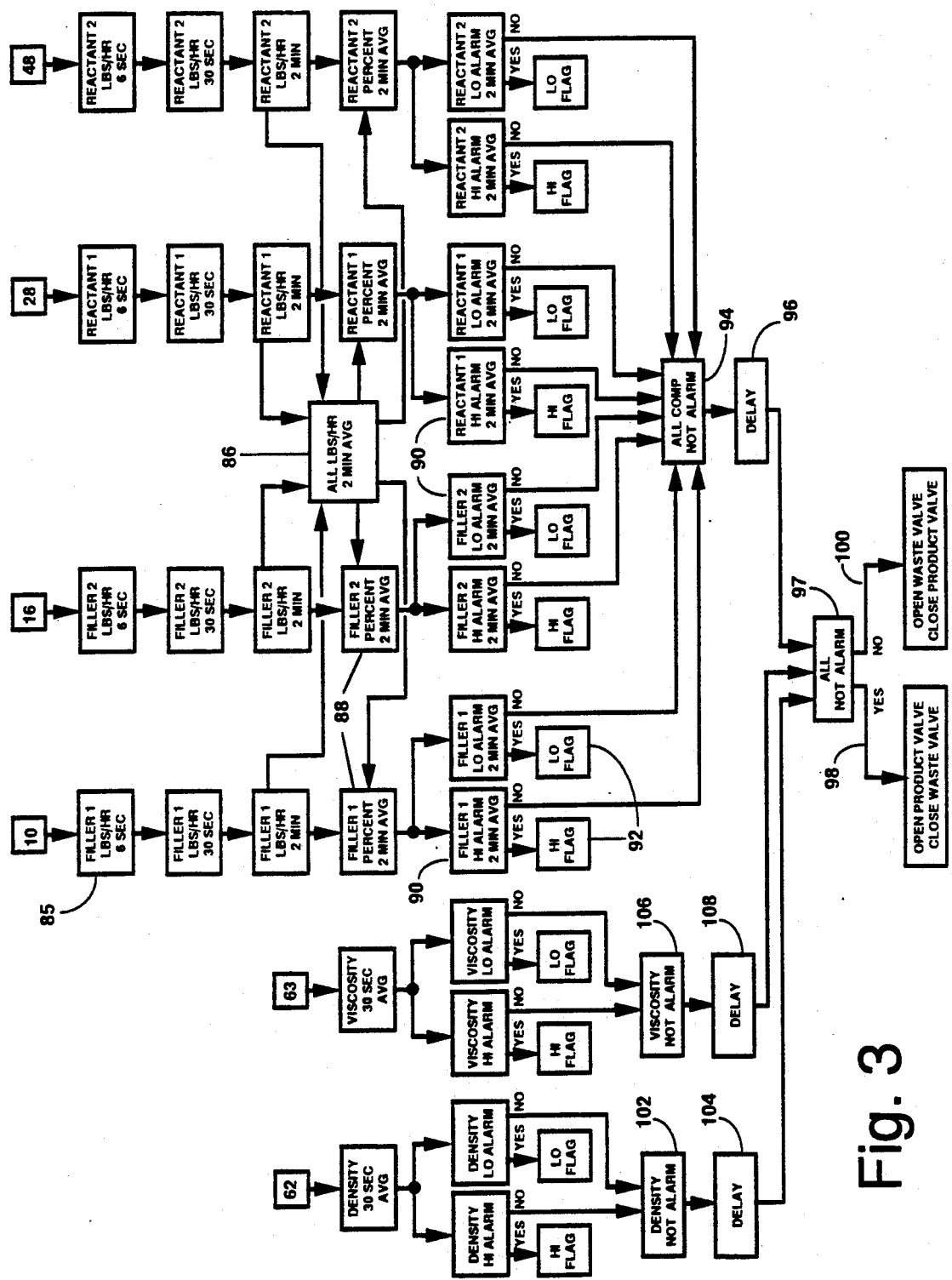
FIG. 3 is a block diagram schematically illustrating details of the control system of FIG. 2.

With reference to FIG. 3, LIW feeder 10 measures mass flow (gravimetric feed rate) data values in pounds per hour (lbs/hr) of raw material supplied, and outputs a signal indicative thereof every second. Six successive such mass flow data values are averaged every six seconds, as at 85. Five successive six-second lbs/hr averages are in turn averaged to produce a thirty-second lbs/hr average. Four successive thirty-second lbs/hr averages are in turn averaged to produce a two-minute lbs/hr average. Note that two minutes is the flowing product residence time in the combining zone of the preferred embodiment, and that thirty seconds is a ¼ fraction of the combining zone residence time. Note further that five minutes is the product residence time in the continuous fluid flow system, including the residence time in the combining zone, in the preferred embodiment.

Procedures like those just described for data from LIW feeder 10 are also accomplished for data from LIW feeders 16, 28 and 48. The two-minute lbs/hr averages for all the LIW feeders are summed (see block 86 in FIG. 3) and the total is then divided into the respective raw material two-minute lbs/hr averages to determine a two-minute percentage of the total mix that is made up by the respective constituent raw materials, as at 88 in FIG. 3. Thus, the proportions of the supplied materials that are in the serial portion of the product flow stream that is in the compounder are determined from measured and fed-forward data indicative of the quantities of materials supplied. This feed-forward aspect of the invention is very important because it enables early detection of a compositional disturbance, diversion to waste of product rendered unacceptable by the disturbance, and fast correction of the disturbance, thereby ensuring that only acceptable product is cast and reducing to a minimum the quantity of waste product. The feed-forward strategy, however, is dependent for success on plug flow in the system. This is because plug flow, with its constant velocity and direction attributes to which allusion was previously made, enables precise prediction of when the serial portion or slug of the flowstream whose composition has been determined will arrive at the diverting zone with its composition reliably unchanged from when it was determined. Recognition of the successful coaction between plug flow and feed-forward composition control is the basis for the broadest aspects of the invention.

The respective two-minute composition percentages are compared to specification for the desired product, and more specifically, to predetermined high and low tolerance limits for the desired percentage/proportion of the respective constituent material in the product, as at decision gates 90 in FIG. 3. If the percentage of constituent material exceeds the high or low limit, this alarm condition is flagged to the system operator, as at 92. Moreover, the alarm signal is sent in a conventional manner (not shown) to cause an appropriate control correction in the rate of input of material by the offending LIW feeder. If, however, the percentage of constituent material is within specification, a signal which can be termed a "go" indication, is sent to another decision gate 94. Absence of a go indication from any connected decision gate is considered a "no-go" indication at gate 94 and other decision gates to be described.

The control system then enters upon a delay, as at 96, to await arrival at the diversion zone 64 in FIG. 1) of the two-minute-averaged, serial portion of the product flowstream whose composition has just been determined. In the preferred embodiment, this delay is about three minutes. After expiration of the delay period, and if all of the composition percentages are within specification (that is to say, if all high and low indications from decision gates 90 are go indications), the controller sends a signal (also a go indication) to further decision gate 97 that is also receiving other go/no-go indications to be described. If all contemporaneous go/no-go indications at gate 97 are go indications, the gate sends a signal, as at 98, to open the appropriate product outlet valve (66 or 68 in FIG. 1) and close waste outlet valve 70.

On the other hand, if any one of the composition percentages is out of specification, after the delay period has expired the absence of a go indication (whose absence it will be recalled is a no-go indication) from decision gate 94 via delay 96 causes gate 97 to open the waste valve and close the product valves, as at 100 in FIG. 3, until such time as a subsequent serial portion of the plug flow product stream determined to have an acceptable composition arrives at the diversion zone. In this manner, it is assured that all product that is cast meets chemical composition specification and there is no requirement to await wet chemical analysis or undergo the expense and hazards of removing off-specification, solidified product from molds in which it was cast while awaiting such analysis.

To further ensure that only acceptable-quality product is cast, the diversion of product may be, and in the preferred embodiment is, also controlled by decision gate 97 in accordance with product density and viscosity. For example, even though the product chemical composition percentages are within specification, the product density may be different from that desired because of entrapped air, or the viscosity may be off because the rate of the binder curing reaction is incorrect. Thus, data from densitometer 62, representing the sensed density of a serial portion of the product flowstream, is compared to high and low tolerance limits in the same manner that the determined composition was compared to specification limits. If the density is above or below the prescribed high and low limits respectively, this alarm condition is flagged to the system operator and appropriate corrective action taken. If, however, the density is below the high limit and above the low limit, go indications are sent to decision gate 102. Decision gate 102 in turn sends a go indication to decision gate 97 after a delay 104 to await arrival at the diversion zone of the serial portion of the product flowstream whose density has just been determined. It will be understood that delay 104 runs concurrently with delay 96 and expires simultaneously therewith, so that the different sets of go/no-go indications acted upon at one time by decision gate 97 refer to the same serial part of the plug flow product stream. Since the densitometer is encountered by each serial portion of the plug flow stream towards the end of its five-minute residence time in the system, or put another way is located near the outlet end of the system, delay 104 is shorter than delay 96 and may for example be about one and one-half minutes. Regardless of its length, delay 104 expires at the same time as the end of three-minute delay 96. At this point in time, and if the density is within tolerance limits, the go indication is sent to decision gate 97. As previously indicated, if all contemporaneous go/no-go indications at gate 97 are go indications, gate 97 signals to open a product valve and close the waste valve.

Similarly, data from viscometer 63, representing the viscosity of a serial portion of the product flowstream, is compared to high and low tolerance limits in the same manner as density was compared. If the viscosity is above the prescribed high limit or below the prescribed low limit, the condition is flagged to the system operator and corrective action initiated. If the viscosity is between the high and low tolerance limits as desired, go indications are sent to decision gate 106. Decision gate 106 sends a go indication to decision gate 97, after a delay 108 to await arrival at the diversion zone of the serial portion of the product flowstream whose viscosity has been determined. It will be understood that delay 108 runs concurrently with delays 104 and 96 and ends at the same time as each, so that the different sets of go/no-go indications all refer to the same part of the plug flow product stream. Since the viscometer is downstream of the densitometer, delay 108 is even shorter than delay 104, and may for example be about one-half minute. Recall that, if all indications at gate 97 are go indications, a product valve is opened. As will be discussed later in connection with FIG. 4, it is convenient to coordinate the various time delays 96, 104, 108 by a continuous elapsed timeline that initiates at system startup time, hereinafter termed time zero.

A better understanding of the manner of operation of the control system will be had by reference to FIG. 4. In that drawing, the elongated blocks in column 110 that are subdivided into four squares represent the two-minute slug of flowstream space that is in the combining zone, as they appear for purposes of illustration in successive thirty-second increments of elapsed time going down the column. This two-minute slug will also correspond to the two-minute average slug discussed above in connection with FIG. 3. In FIG. 4, the two-minute slug is divided into four thirty-second blocks or slugs, which will correspond to the above-discussed thirty-second average slugs. The thirty-second slugs occupied by white space in FIG. 4 are empty. This is as it would be at system startup, time mark zero. Since there is no product in the combining zone at this time, there is no composition to compare to specification and the second column "Quality of 2-Min Slug" in FIG. 4 is blank. The third column, representing elapsed time from startup, is of course zero.

After startup and thirty seconds have elapsed, the system condition moves down to the second row of the columns of FIG. 4, and the first thirty-second slug of product whose composition has been averaged by the control system appears and for purposes of this discussion has been assigned number 1. Because there is still empty space in the two-minute slug, and because there is as yet no meaningful two-minute average to determine, there is still no composition quality to assess in column 2. Thirty seconds later (sixty seconds of elapsed time from startup), the system condition moves down to the third row where thirty-second slug no. 2 has appeared with slug no. 1 moved forwardly in the flowstream (left to right as viewed in FIG. 4). Thirty seconds later slug no. 3 appears and then, thirty seconds still later, slug no. 4 appears, as slugs no. 1 and 2 successively advance through the system.

With the appearance of thirty-second slug no. 4 at 120 seconds of elapsed time, the combining zone is now occupied with product and a meaningful two-minute average composition percentage is determined as at 88 in FIG. 3. Assume that the composition of the first two-minute average slug of product does not meet specification, which is normal because systems require a period after startup for achievement of steady state conditions. Accordingly, the quality of the product composition is determined to be unacceptable and the system is in a no-go condition for casting purposes as indicated in the second column of FIG. 4. The controller will open the waste valve and close the product valves as indicated at 100 in FIG. 3, after a three-minute delay at 96 for the first two-minute average slug of product to arrive at diversion zone 64 (FIG. 1).

In FIG. 4, after 150 seconds of elapsed time, thirty-second slug no. 5 appears. In the interests of abbreviating this discussion, it will be assumed that slug no. 5 is of acceptable composition as indicated by a change in cross-hatching on the drawing, but it will be understood that this has not been determined by the system and that in practice systems typically require more elapsed time than 150 seconds to reach steady state. Regardless, because preceding, unacceptable thirty-second average slugs no. 4, 3 and 2 are still in the running two-minute average slug of product, the quality of the latter slug remains out of specification and unacceptable, and the system is still in a no-go condition. Note that thirty-second slug no. 1 has been dropped from consideration, which is illustrative of the first-in, first-out (FIFO) strategy employed in determining the average for the two-minute slug of product in the combining zone. Put another way, the two-minute average is updated every thirty seconds, so that it is a running average. It will be understood that the FIFO technique is also used in determining the thirty-second averages, as well as the six-second averages, which are also running averages.

By the time 240 seconds have elapsed, thirty-second slugs no. 8, 7, 6 and 5 are in the combining zone and constitute the two-minute average. Assuming for purposes of this discussion that each of these thirty-second slugs is of acceptable composition, the quality of the composition of the two-minute slug of product in the combining zone is determined to be acceptable and the system is now determined to be in a go condition for casting insofar as meeting composition specification is concerned. Accordingly, decision gate 94 of FIG. 3 provides a go indication for closing the waste valve and opening a product valve after a three-minute delay at 96 to allow time for the acceptable slug to reach the diversion zone. This delay would expire at the elapsed time of 420 seconds from time zero (FIG. 4). Recalling that delay 104 (FIG. 3) for densitometer 62 is one and one-half minutes, the density of the two-minute average slug made up of thirty-second average slugs 8, 7, 6, 5, whose composition was determined at elapsed time 240 seconds, must be and is determined 1.5 minutes prior to elapsed time 420 seconds (namely, at elapsed time 330 seconds) so that 1.5-minute delay 104 also expires at diversion time 420 seconds, and the density go/no-go indication acted upon by decision gate 97 from delay 104 refers to the same part of the plug flow product stream as the contemporaneous composition go/no-go indication from delay 96. Put another way, the two-minute average slug of product consisting of thirty-second average slugs 8, 7, 6 and 5 has flowed downstream from the compounder to, and is passing, the densitometer at elapsed time 330 seconds. Note from FIG. 4 that, also at this elapsed time, a subsequent two-minute average slug consisting of thirty-second average slugs 11, 10, 9, and 8 is having its composition determined for later use.

Recalling that delay 108 for viscometer 63 is one-half minute, the viscosity of the two-minute average slug consisting of thirty-second slugs 8, 7, 6, 5 must be and is determined one-half minute prior to diversion time (420 seconds) for that slug of product, namely, at 390 seconds, so that 0.5-minute delay 108 also expires at elapsed time 420 seconds and the viscosity go/no-go indications from delay 108 that are acted upon by decision gate 97 at elapsed time 420 seconds refer to the same part of the product plug flow stream as the contemporaneous density and composition indications. Stated otherwise, the two-minute average slug 8, 7, 6, 5 is passing the viscometer at elapsed time 390 seconds (at which time a further subsequent two-minute average slug consisting of thirty-second average slugs 13, 12, 11, and 10 is having its composition determined for later use).

It will be understood that an alternative way to use the elapsed timeline that is the third column of FIG. 4 is to establish as the benchmark from which to measure delay that elapsed time which is two minutes prior to the elapsed time at which the two-minute average slug composition is determined, which is the time that the leading edge of the slug of product whose composition was just determined began to enter the determination process. That would be 120 seconds elapsed time for the two-minute slug consisting of thirty-second slugs 8, 7, 6, 5, whose composition was determined at the 240-second mark. With this technique, the time delay to diversion would be five minutes from the 120-second mark, rather than three minutes from the 240 second mark. In either event, diversion time remains at the 420 second mark. It will be recalled that five minutes is the system residence time in the preferred embodiment. And it will be understood that the length of the various delays will vary in accordance with the configuration of particular systems, particularly the length of the flowstream and the location of the various components along it.

It will be appreciated that selection of which product valve to open, as well as sensing when a mold is full and controlling the stop-and-go movement of the mold conveyors, are accomplished by the controller in conventional ways that form no part of the invention.

Referring again to FIG. 4, after elapse of 270 seconds from starting time, the next two-minute average slug composition is determined and this two-minute average slug contains thirty-second average slugs no. 9, 8, 7 and 6. Assume that it remains of acceptable quality in terms of meeting composition specification. Although a new set of go/no-go indications and three-, 1.5-, and 0.5-minute delays which run in concurrent, overlapping relationship with the previously-started delays are established for the new two-minute average slug, there is no change of mode at the outlets of the casting system at diversion time for the newly determined slug (450 seconds), assuming that the density and viscosity testing also provided go indications for the 450-second mark on the elapsed timeline.

However, assume that after elapse of 30x seconds on the elapsed timeline, where x is a thirty-second slug no., slug no. x has gone out of specification because of a feeder aberration or other reason, and throws out of specification the first two-minute average in which slug no. x is considered. In accordance with the invention, the composition of the two-minute average consisting of four thirty-second slug nos. x, (x-1), (x-2), and (x-3) is determined at elapsed time 30x seconds, and the product is determined to be no-go for casting purposes. Accordingly, the controller sends a signal to open the waste valve and close the then-open product valve after the three-minute delay required for the first two-minute average slug of which thirty-second slug no. x is a part to arrive at the diverting zone (which will be at 30x+180 seconds on the elapsed timeline). The waste valve will remain open for as long as thirty-second average slug no. x causes the two-minute average to be out of specification, as well as for as long as any immediately succeeding thirty-second slugs cause the two-minute average to be out of specification. At such time as feedrate corrections cause the two-minute average to go back into specification (recalling that the two-minute average is updated every thirty seconds), the waste valve will be closed and a product valve opened, such closing and opening steps being taken after the three-minute delay necessary for the acceptable two-minute slug to arrive at the diversion zone.

It will be understood that at any time that the density or viscosity test determines an unacceptable condition to exist, a no-go indication is provided to close the then-open product valve and open the waste valve after the appropriate delay 104 or 108, and this mode of operation sustained until such time as the material flowing through the on-line measurement devices is again acceptable, which will change the no-go indication to a go indication after the appropriate delay. Alternatively, the indication from the densitometer can be used to draw a vacuum in the aforementioned chamber surrounding the casting outlet and mold, when needed to evacuate from the product, as it emerges from the casting outlet, entrapped air that caused low density readings. Also, plural density and viscosity readings taken at intervals of, for example, 30 seconds as a given two-minute slug passes the respective instruments can be averaged, in the same manner that the feed rates are averaged, to derive the density and viscosity go/no-go indications.

In the foregoing manner, the inventive system ensures that only product meeting composition specification is cast into molds, that off-specification product is recognized early and rejected without further expensive processing being performed on it and without delays to await wet chemical analysis to determine whether it is acceptable or not, and that operational parameters causing waste are quickly detected and corrected. In practice, the system has proved to have a very high degree of precision and reliability.

Figure 5:
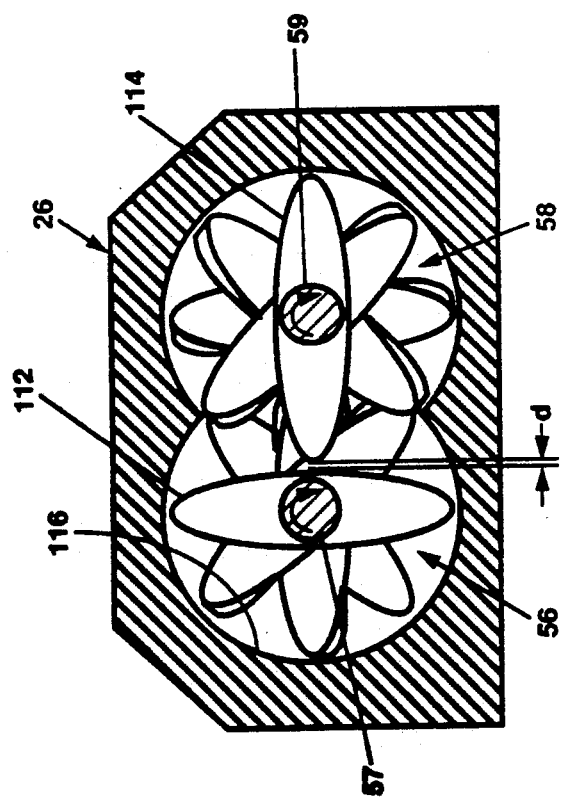
FIG. 5 is a partial, cross-sectional view illustrating details of the compounder of the system of FIG. 1.

Turning now to FIG. 5, co-rotating, twin-screw compounder 26 is a continuous processor, of the type shown in U.S. Pat. No. 3,618,902, that is available commercially from the Teledyne Readco company of York, Pa., except for modifications made in accordance with the invention as will be described. The compounder, which is Teledyne-Readco's 2" Model, comprises twin screws 56, 58 having mixing and conveying elements, as 112, 114, mounted axially along and rotating with parallel shafts 57, 59 in a chamber having walls 116 that define the general shape of a FIG. 8 as shown. In order along the direction of flow, the rotary elements mounted on each shaft in the preferred embodiment comprise a spiral feed screw, two straight (nonhelical), lenticular mixing elements or paddles, twenty-one helical 30° forward, lenticular, mixing and conveying paddles, and two lenticular, helical 30° reversing paddles to reduce pressure at the discharge of the compounder where the shafts are supported by outboard bearings. All such elements are available commercially from Teledyne-Readco, except as modified in the manner to be described. It will be appreciated that the lenticular elements on shafts 57, 59 are paired, and the mates of each pair intermesh with one another as shown in FIG. 5.

As is conventional in processors of this type, the tips of the lenticular paddles transfer virtually all of the material off of the chamber walls and the adjacent, mating paddle for a self-cleaning action, as the shafts rotate and the rotary elements mix and convey the fluid product along the combining zone. In the commercially built machine, the clearance between the tip of each paddle and the wall and the surface of the intermeshing or mating paddle that it passes by is very small, to maximize mixing efficiency. This maximization, however, comes at a price, the tradeoff being development of very high shear forces in the product on the surface being passed. Where the product is an energetic material, these shear forces can develop heat and pressure in the product to levels that are unwise from a safety viewpoint. This problem is overcome in accordance with the invention without significant compromise in efficiency by shaving material from the surfaces of the paddles of the commercially as-built machine so that the screw-to-wall and screw-to-screw clearances (such as distance "d" in FIG. 5) are at least about a distance that is twice the median particle size of the solid filler material, but not greater than about 690 microns. Put by way of example, if the median particle size of the filler is about 270 microns, the clearance would be in a range of from about 540 microns to about 690 microns. Where, as in the preferred embodiment, more than one filler material is used, the filler having the largest median particle size is the determining factor.

The concept of feed-forward, statistical composition control in combination with plug flow is a physical concept that is independent of particular chemical compositions. The concept has applicability to the manufacture of a variety of materials in a diversity of industries, so long as the product being made is capable of plug flow. Flow rates, process temperatures and other process variables will of course be adapted to suit the particular product being made. Most if not all of the products to which the concept applies will be filled formulations, and in order to practice the invention with such formulations the product will have a degree of fill established at a magnitude within a range having a minimum defined by the amount necessary to effect plug flow, and a maximum defined by flow difficulties preventing satisfactory throughput.

Unexpectedly, it has been found that the rate of volumetric accumulation in the boundary layer (i.e., on the walls of the piping and other flowstream-confining components) decreases markedly as the viscosity of the product increases. Products to which the invention is applicable typically have very high viscosities (of the order of about 0.25 to 25 kilopoise, usually and preferably from about 1 to about 5 kilopoise). Hence, when operating in accordance with the invention, extended continuous operating periods are practical before it becomes necessary to shut the system down for cleaning. When, however, boundary layer accumulation is sufficient to require a cleanout of the system, such action is readily effected in the system of FIG. 1. Input from solid material feeders 10 and 16 is terminated, and valves 30 and 50 are closed to stop the inflow of liquid raw materials from feeders 28 and 48 respectively. Valve 44 is opened, and solvent liquid stored in vessel 46 is pumped through the length of the system to effect the necessary cleansing action and be discharged through waste outlet 82. After cleaning, valve 44 is closed and production operations can be resumed as described above. It will be appreciated that the particular solvent used will depend upon the product being produced.

Loss-in-weight feeding involves weighing the entire feeder, including the contents of the hopper or tank. Eventually, the feeders must be refilled. Gravimetric operation is necessarily interrupted during refill because of the lack of a meaningful weight measurement as material simultaneously enters and leaves a feeder. Metering speed is held constant during refill periods to maintain steady-state volumetric conditions and control. Accordingly, refills should be accomplished quickly, preferably within about twenty seconds. Refills may be performed automatically in response to the sensed fill level of a feeder, when it decreases to a magnitude at which refill is required. After a refill is accomplished, a feeder automatically returns to gravimetric operation.

As to equipment utilized, any suitable type of equipment of conventional design can be utilized in the system. The Teledyne-Readco twin-screw compounder has been described above. LIW feeders available commercially from the K-Tron Corporation, of Pitman, N.J., can be used. Similarly, any suitable, commercial online densitometer such as those available from Ronan Engineering Company of Florence, Ky., can be employed, and online viscometers are available through the Nametre Company, of Metuchen, N.J. In practicing the preferred embodiment, the process controller comprises motor controllers (commercially available from the above-referenced K-Tron Corp.), and a programmable logic controller (Model 530C of Texas Instruments, Inc. of Johnson City, Tenn.), both being driven by a personal computer (Model Z-248 of Zenith Data Systems Corporation, of St. Joseph, Mich.) suitably programmed using commercially available data acquisition and process control software (Model "Genesis" of Iconics, Inc. of Foxboro, Mass.). However, it will be understood that any hardware and/or software suitable for carrying out the purposes described above in connection with FIG. 3 and elsewhere herein may be utilized without departing from the principles and spirit of the invention.

EXAMPLE 1

The equipment described above is utilized in this run. Raw materials comprising particulate, solid ammonium sulfate as a first filler, elemental aluminum powder (AL) as a second filler, liquid hydroxyl-terminated polybutadiene as a first reactant or constituent of polyurethane binder, and liquid isophorone diisocyanate (IPDI) as the second binder reactant or constituent, are contained in LIW feeders 10, 16, 28, and 48 respectively. Ammonium sulfate (hereafter termed NHSO) is a material that makes an effective inert simulant for sym-cyclotrimethylene trinitramine, which is a preferred oxidizer for energetic materials. The polybutadiene is contained in a binder premix slurry (PBD). The premix also contains about 48.7% liquid di-(2-ethylhexyl) adipate as a plasticizer, about 0.7% solid 2,2'-methylenebis as an anti-oxidant, about 1.7% solid N,N 2-hydroxyethyl dimethyl-hydantoin as a wetting aid, about 0.2% liquid dibutyltin dilaurate (DBTL) as a catalyst for the binder-curing reaction, and the balance is essentially polybutadiene in an amount of about 48.7%. Unless otherwise specified, all composition percentages given herein are by weight. The median particle size of the NHSO is about 270 microns, and that of the AL is about 15 microns. The screw-to-screw and screw-to-wall clearances in the compounder are about 635 microns.

Low and high specification tolerance limits for NHSO are respectively set at 56.5% and 65.5%, and for AL at 18% and 22%. For PBD the minimum is set at 14.34% and the maximum at 15.4%, and for IPDI at 0.8% and 1.1% respectively. Density low and high tolerance limits are 1.3 grams per cubic centimeter (g/cc) and 1.7 g/cc. Viscosity tolerance limits are from 0.25 to 25 kilopoise (kp). Composition averages are determined at six-second, thirty-second, and two-minute intervals as described above. Time delays to diversion are three minutes from the two-minute average composition determination, 1.5 minutes from the density determination, and 0.5 minutes from the viscosity determination. Total residence time in the system is about five minutes, including about two minutes residence time (T) in the combining zone (the compounder). The volume of the combining zone (V) is about 953 cubic centimeters (cc), the degree of fill of the combining zone (E) is about 96% (or E=0.96), and the volumetric feed rate of materials entering the combining zone (Uo) is about 460 cc per minute, whereby T=VE/Uo which indicates that plug flow is achieved. The product has a degree of fill of about 84%. The controlled amount of the reaction catalyst DBTL given above is effective to constitute about 0.02% of the product, whereby the extent to which the curing reaction is completed at diversion time is about 6%. The screws in the compounder are turned at the rate of about 100 revolutions per minute (rpm). Temperature of the product at the compounder discharge is maintained in a range of about 50° to 70° C., preferably about 53° to 57° C. The piping downstream of the compounder is 2" nominal diameter.

Table 1 below shows conditions at representative marks along the elapsed timeline for the run after startup and achievement of steady state operation, and before shutdown of the system is initiated. Consecutive mark (MK) numbers are spaced thirty seconds apart, i.e., mark number 1 would be thirty seconds elapsed time after startup, which is mark zero. In the table, column 1 shows the mark number. Columns 2, 3, 4 and 5 are the thirty-second average values for each LIW feeder input rate in pounds per hour. Column 6 shows product pressure at the discharge of the combining zone, in pounds per square inch above atmospheric (psig). Columns 7 and 8 respectively show viscosity and density. Columns 9-12 respectively show the two-minute average, percentage compositions for NHSO, AL, PBD, and IPDI.

TABLE 1

| 1 MK NO. | 2 NHSO IN LB/H | 3 AL IN LB/H | 4 PBD IN LB/H | 5 IPDI IN LB/H | 6 PROD PRES PSIG | 7 PROD VISC KP | 8 PROD DENS G/CC | 9 PROD NHSO % | 10 PROD AL % | 11 PROD PBD % | 12 PROD IPDI % |
|---|---|---|---|---|---|---|---|---|---|---|---|
| 40 | 63.97 | 19.95 | 15.05 | 1.00 | 6.13 | 3.98 | 1.52 | 63.99 | 19.96 | 15.05 | 1.00 |
| 60 | 63.69 | 19.73 | 14.95 | 1.00 | 4.75 | 1.86 | 1.57 | 64.09 | 19.86 | 15.04 | 1.01 |
| 80 | 63.33 | 20.03 | 14.78 | 0.99 | 5.13 | 1.80 | 1.56 | 63.89 | 20.21 | 14.91 | 1.00 |
| 100 | 64.06 | 19.91 | 15.04 | 1.00 | 7.13 | 2.25 | 1.53 | 64.05 | 19.91 | 15.04 | 1.00 |
| 120 | 63.77 | 19.85 | 15.07 | 1.01 | 2.00 | 0.53 | 1.46 | 63.96 | 19.91 | 15.12 | 1.01 |
| 140 | 64.71 | 19.98 | 14.98 | 0.97 | 2.88 | 0.79 | 1.52 | 64.30 | 19.85 | 14.88 | 0.96 |
| 160 | 63.63 | 19.73 | 14.81 | 1.00 | 5.13 | 1.43 | 1.54 | 64.16 | 19.90 | 14.93 | 1.01 |
| 180 | 64.33 | 20.00 | 14.96 | 0.99 | 3.75 | 0.72 | 1.52 | 64.15 | 19.94 | 14.92 | 0.99 |
| 200 | 63.80 | 19.93 | 14.90 | 0.99 | 2.38 | 1.60 | 1.56 | 64.04 | 20.01 | 14.96 | 0.99 |
| 219 | 63.87 | 16.92 | 14.98 | 0.96 | 3.63 | 1.41 | 1.53 | 66.03 | 17.49 | 15.49 | 0.99 |
| 223 | 64.11 | 19.53 | 14.88 | 0.99 | 3.63 | 1.57 | 1.54 | 64.43 | 19.63 | 14.95 | 0.99 |
| 240 | 63.87 | 20.15 | 14.99 | 0.90 | 3.13 | 0.96 | 1.51 | 63.93 | 20.17 | 15.00 | 0.90 |

Note in Table 1 that at mark 219 the thirty-second average value for the AL LIW feeder input rate (column 3) caused the two-minute average percent composition to be out of specification (see columns 9 and 10).

There were no significant feeder perturbations during the run and all material produced from mark 40 to mark 160 was cast into molds. Table 2 shows conditions at exemplary marks after stable operation is achieved.

TABLE 2

| 1 MK NO. | 2 NHSO IN LB/H | 3 AL IN LB/H | 4 PBD IN LB/H | 5 IPDI IN LB/H | 6 PROD PRES PSIG | 7 PROD VISC KP | 8 PROD DENS G/CC | 9 PROD NHSO % | 10 PROD AL % | 11 PROD PBD % | 12 PROD IPDI % |
|---|---|---|---|---|---|---|---|---|---|---|---|
| 40 | 62.54 | 20.07 | 14.79 | 0.98 | ATM | 0.15 | 1.30 | 63.57 | 20.40 | 15.03 | 1.00 |
| 60 | 62.98 | 19.93 | 14.92 | 0.99 | ATM | 0.29 | 1.30 | 63.73 | 20.17 | 15.10 | 1.00 |
| 80 | 63.42 | 19.86 | 15.11 | 1.00 | ATM | 0.17 | 1.30 | 63.81 | 19.99 | 15.20 | 1.00 |
| 100 | 63.65 | 19.98 | 15.09 | 0.99 | ATM | 0.27 | 1.30 | 63.83 | 20.04 | 15.14 | 0.99 |
| 120 | 64.55 | 19.91 | 15.02 | 0.98 | ATM | 0.15 | 1.30 | 64.25 | 19.82 | 14.95 | 0.98 |
| 140 | 63.94 | 20.05 | 14.94 | 1.00 | ATM | 0.54 | 1.30 | 63.99 | 20.06 | 14.95 | 1.00 |
| 150 | 64.20 | 20.41 | 14.98 | 0.96 | 0.5 | 1.14 | 1.30 | 63.85 | 20.30 | 14.89 | 0.95 |
| 160 | 64.10 | 20.09 | 14.94 | 0.98 | ATM | 0.77 | 1.30 | 64.03 | 20.07 | 14.92 | 0.98 |

At mark 219, the controller sent a signal to divert the product to waste after the appropriate delay as described above. This condition was corrected by mark 223 when the controller sent a signal to divert the product to casting again after a delay.

The system shutdown procedure began at mark 243 and was completed at mark 251, and the system was then flushed using 1.1.1 trichloroethane as the solvent.

EXAMPLE 2

For this run, the equipment, materials, median particle sizes, tolerance limits, determination intervals, time delays, residence times, volume of combining zone, degree of fill of the product, and screw rpm are the same as in Example 1. The controlled amount of reaction catalyst DBTL is effective to constitute about 0.01% of the product, whereby the extent to which the curing reaction is completed at diversion time is about 2%. Compounder discharge pressure remained at or near atmospheric (0 psig) for the duration of the run. This is denoted by ATM in Table 2. The degree of fill of the combining zone (E) is about 0.90% and the volumetric feed rate of materials entering the combining zone (Uo) is about 442 cc/min, whereby T=VE/Uo.

System shutdown was begun at mark 160 and was completed by mark 189. Flushing was accomplished as before.

EXAMPLE 3

In this run, the materials, equipment, median particle sizes, tolerance limits, determination intervals, time delays, residence times, volume of the combining zone, degree of fill of the product, and screw rpm are the same as in Examples 1 and 2. The controlled amount of reaction catalyst DBTL is effective to constitute about 0.017% of the product, whereby the extent to which the curing reaction is completed at diversion time is about 4%. The degree of fill of the combining zone (E) is about 0.92, and the volumetric feed rate of materials entering the combining zone (Uo) is about 445 cc/min, whereby T=VE/Uo. Table 3 shows conditions at marks 40 through 117 during the casting of product into molds.

TABLE 3

| 1 MK NO. | 2 NHSO IN LB/H | 3 AL IN LB/H | 4 PBD IN LB/H | 5 IPDI IN LB/H | 6 PROD PRES PSIG | 7 PROD VISC KP | 8 PROD DENS G/CC | 9 PROD NHSO % | 10 PROD AL % | 11 PROD PBD % | 12 PROD IPDI % |
|---|---|---|---|---|---|---|---|---|---|---|---|
| 40 | 64.05 | 19.39 | 14.94 | 0.99 | ATM | 0.98 | 1.30 | 64.45 | 19.52 | 15.04 | 0.99 |
| 60 | 63.73 | 19.86 | 15.08 | 0.98 | 2.13 | 1.13 | 1.55 | 63.95 | 19.93 | 15.14 | 0.99 |
| 80 | 64.06 | 19.83 | 15.03 | 1.01 | 1.13 | 1.12 | 1.56 | 64.10 | 19.84 | 15.04 | 1.01 |
| 100 | 63.97 | 19.85 | 15.05 | 0.97 | 1.25 | 0.93 | 1.55 | 64.07 | 19.88 | 15.08 | 0.97 |
| 117 | 62.43 | 19.99 | 15.01 | 0.99 | 1.00 | 1.06 | 1.56 | 63.43 | 20.31 | 15.25 | 1.01 |

System shutdown began at mark 120 and was completed by mark 146. Flushing was accomplished as before.

Although the inventive system is applicable to the continuous processing of diverse formulations, it has particular utility in the manufacture of highly filled polymers, especially those incorporating one or more particulate solid materials dispersed in a thermosetting, elastomeric binder. With such products, it is preferred to maintain the degree of fill within a range of about 70% to 90% particulate solids by weight. The balance is, of course, essentially liquid in the combining zone and in the preferred embodiment is a reacting, oligomeric liquid as the binder constituents begin to react with on another in the process of forming the binder which will complete its curing in the molds. It is preferred that the curing reaction be about 1% to 25% completed at the time that the product is diverted to the product outlet to ensure satisfactory operation, because the rate at which the curing reaction goes to completion can affect the flow characteristics of the product in the continuous flow system. The rate of reaction is controlled by controlling the concentration of binder-curing reaction catalyst in the input binder premix. It is preferred that the amount of catalyst in the product be from about 0.0015% to about 0.055%. This control, along with degree of fill, is also used to control product viscosity. It should be noted that with continuous processing in accordance with the invention, faster reaction rates are possible than with batch processes, with concomitant reduction of cure times from the order of about three days to about four hours.

Although the invention has been described in connection with a preferred embodiment and specific examples, and finds particular utility in the manufacture of energetic materials incorporating one or more solid, particulate oxidizers (such as sym-cyclotrimethylene trinitramine and elemental aluminum) dispersed in a thermosetting, elastomeric, polyurethane resin binder, such are not to be taken as limiting the principles of the invention as defined by the appended claims.

We claim:

1. Continuous process for making a fluid product, comprising
   continuously supplying materials to a combining zone in a fluid flow system having a diverting zone downstream of the combining zone,
   the system also having a product outlet and another outlet,
   the outlets being downstream of the diverting zone and in parallel flow relationship with one another,
   continuously combining the supplied materials to form a fluid product in the combining zone,
   establishing continuous plug flow of the product in a stream toward the diverting zone,
   measuring the quantities of the materials supplied,
   determining time-averaged proportions of the supplied materials in a serial portion of the product flow stream from the measured quantities of materials supplied,
   comparing the time-averaged proportions to a specification,
   diverting the flowing product from the diverting zone toward the product outlet only when the compared proportions are within the specification and the serial portion having the determined proportions arrives at the diverting zone, and
   diverting the flowing product from the diverting zone toward the other outlet when the compared proportions are out of the specification and the serial portion having the determined proportions arrives at the diverting zone,
   whereby all product diverted to the product outlet meets the specification.

2. The process of claim 1, in which
   the supplied materials include at least one liquid material and at least one particulate, solid, filler material, and
   the product is highly filled.

3. The process of claim 2, in which
   the product consists of from about 70% to about 90% by weight filler material dispersed in a matrix.

4. The process of claim 3, in which
   the matrix is an elastomeric binder.

5. The process of claim 4, in which
   the binder is a thermosetting elastomer.

6. The process of claim 4, in which
   the supplied materials include first and second liquid constituents which undergo reaction with one another to form the binder,
   the supplied materials also include a catalyst for the reaction, and
   the catalyst is present in an amount sufficient to cause the reaction to go from about 1% to about 25% to completion by the time the product arrives at the diverting zone.

7. The process of claim 1, in which
   the product in the combining zone flows in accordance with the relationship $T = VE/U_o$, where T equals residence time in the combining zone, V equals volume of the combining zone, E equals degree of fill of the combining zone, and $U_o$ equals the volumetric feed rate of materials entering the combining zone.

8. The process of claim 7, in which
   the combining zone residence time T is the basis for determining the time-averaged proportions of the supplied materials in the serial portion of the product flow stream.

9. The process of claim 1, in which
   the materials are supplied to an inlet region of the combining zone,
   the product has a system residence time for flow from the inlet region to the diverting zone,
   the step of determining time-averaged proportions includes averaging quantities of materials supplied at intervals over a predetermined period of time which is shorter than the system residence time and which is the basis for determining the time-averaged proportions of the supplied materials in the serial portion of the product flow stream, and
   the step of diverting the product to the product outlet or to the other outlet is performed after a time delay that is equal to the system residence time minus the predetermined period of time, which is when the serial portion having the determined proportions arrives at the diverting zone.

10. The process of claim 1, including
    casting product from the product outlet into a mold.

11. Process for combining at least three raw materials to produce a highly filled output product for use in a subsequent casting process, the process functioning to continuously and consistently produce acceptable products and comprising the steps of
    continuously and simultaneously feeding at least three raw materials into a combining zone in a continuous fluid flow system while measuring the amount of each of the raw materials being fed, the raw materials including first and second liquid constituents which react with one another to form an elastomeric binder, the raw materials also including a particulate, solid filler material, establishing continuous plug flow of the materials through the system, determining at intervals an average of the measured amount of each of the raw materials being fed, determining a time-averaged percentage composition for each of the raw materials in the output product of the system from the average amounts determined at intervals, comparing the time-averaged percentage composition for each of the raw materials to predetermined high and low tolerance limits for the materials in the desired output product, and causing time-delayed transfer of acceptable output product to the casting process only when all material percentages are within the high and low tolerance limits, whereby all output product from the system which is transferred to the casting process meets product specification.

12. The process of claim 11, wherein the continuous plug flow is established with aid of a co-rotating, twin-screw compounder in the combining zone.

13. The process of claim 12, wherein the co-rotating, twin-screw compounder functions as a plug flow reactor defined by the relationship $T = VE/U_o$, in which T equals residence time in the reactor, V equals volume of the reactor, E equals degree of fill of the reactor, and $U_o$ equals the total raw material volumetric feedrate entering the reactor, and wherein the reactor residence time T is used in the step of determining a time-averaged percentage composition as the basis for determining said composition.

14. The process of claim 11 wherein the filler is an oxidizer, and the elastomeric binder is a polyurethane.

15. Process for producing a highly filled thermosetting elastomeric output product for use in a subsequent casting process, the product being produced in a continuous fluid flow system which receives as inputs at least three raw materials in a combining zone in the system, the raw materials including first and second liquid constituents which react with one another to form an elastomeric binder, the raw materials also including a particulate solid filler material, the materials being transferred through the system in plug flow and having a residence time T from the time when the raw materials enter the combining zone until the time when mixed output product is transferred out of the combining zone, the residence time T being equal to the product of the volume of the combining zone times the degree of fill of the combining zone, divided by the total volumetric feedrate of the raw material entering the combining zone, the process including control of whether or not the output product is transferred into the casting process or to a waste outlet based upon measurements and calculations to determine whether or not the output product meets specification, comprising the steps of measuring the gravimetric flow rates of the respective input raw materials as they are fed into the system, averaging the measured gravimetric flow rates of the respective input raw materials over a time interval which is a fraction 1/n of the residence time T to obtain an intermediate flow rate value for each of the respective input raw materials, maintaining a running average of n intermediate flow rate values for each of the respective input raw materials over a period of time equal to the residence time T to obtain residence time average values for the respective input raw materials, summing all of the residence time average values for all of the input raw materials to obtain a residence time average value for all of the materials in the combining zone, dividing the residence time average values for the respective input raw materials by the residence time average value for all of the materials in the combining zone to determine the respective residence time percentage values of the total mix made up by each of the constituent raw materials, comparing each of the residence time percentage values with predetermined tolerance limits to determine if the percentage of each component within the mix is acceptable or not acceptable, if any one of the residence time percentage values is not acceptable, creating an indication of non-acceptability in the form of a no-go indication, and otherwise creating a go indication, testing the plug flow stream of mixed material downstream of the combining zone, including viscosity and density testing, over a predetermined period of time before the material is ready to be transferred to a casting process, the post-mixing testing also generating a go/no-go indication, delaying acting upon the go/no-go indications obtained by the comparison of the residence time percentage values with the tolerance limits and by the post-mixing testing until the passage of the predetermined period of time so that the different sets of go/no-go indications acted upon at one time refer to the same part of the plug flow stream, and if all go/no-go indications are go indications, diverting the plug flow output stream to the subsequent casting process, and otherwise, if any of the go/no-go indications are no-go indications, diverting the plug flow output stream to a waste outlet.

* * * * *